United States Patent [19]

Seo

[11] Patent Number: 5,345,318
[45] Date of Patent: Sep. 6, 1994

[54] METHOD FOR RECORDING RECEIVED PICTURE DATA IN A FACSIMILE DEVICE

[75] Inventor: Seok-hwan Seo, Suwon, Rep. of Korea

[73] Assignee: SamSung Electronics Co., Ltd., Suwon, Rep. of Korea

[21] Appl. No.: 981,139

[22] Filed: Nov. 24, 1992

[51] Int. Cl.$^5$ ............................................. H04N 1/00
[52] U.S. Cl. ..................................... 358/449; 358/453
[58] Field of Search ............... 358/400, 405, 449, 451, 358/453, 462, 488, 498, 443; H04N 1/00

[56] References Cited

U.S. PATENT DOCUMENTS

| | | |
|---|---|---|
| 4,631,596 | 12/1986 | Yaguchi . |
| 4,679,093 | 7/1987 | Yaguchi ............................ 358/449 |
| 4,695,898 | 9/1987 | Ishikawa et al. .................. 358/449 |
| 4,805,135 | 2/1989 | Ochi et al. . |
| 4,823,376 | 4/1989 | Takahashi .......................... 379/100 |
| 4,924,324 | 5/1990 | Takaoka . |
| 5,001,571 | 3/1991 | Marano . |
| 5,057,937 | 10/1991 | Muramatsu et al. ............... 358/405 |
| 5,068,741 | 11/1991 | Takahashi . |
| 5,148,495 | 9/1992 | Imao et al. . |

FOREIGN PATENT DOCUMENTS 55-121776 9/1980 Japan .

Primary Examiner—Edward L. Coles, Sr.
Assistant Examiner—Kim Yen Vu
Attorney, Agent, or Firm—Robert E. Bushnell

[57] ABSTRACT

Disclosed is a facsimile data recording method for recording data on a sheet of paper in a facsimile apparatus which includes a recorder for recording received picture data on the sheet of paper. The method comprises the steps of setting a divisible region composed of a plurality of line picture data among the picture data ready to be recorded and capable of performing division of pages, setting a line which contains the minimum number of black pixels among the lines included in the divisible region as a page division line, and performing recording of all the picture data while performing a form feeding operation between the page division line and the next line thereto, thereby making the recording appearance good and the loss of received picture data prevented. Also, the method can be embodied via software to avoid additional hardware costs.

20 Claims, 6 Drawing Sheets

METHOD FOR RECORDING RECEIVED PICTURE DATA IN A FACSIMILE DEVICE

BACKGROUND OF THE INVENTION

The present invention relates to a method for recording a received message in a facsimile apparatus, and more particularly, to a method for receiving image data and recording it on separate sheets of paper.

A facsimile apparatus of a transmitting side scans a still picture and converts the scanned still picture into an electrical image signal to then transmit it, while the facsimile apparatus of a receiving side records the received image signal by way of being synchronized with a transmitting side. Accordingly, the still picture is regenerated in the facsimile apparatus of the receiving side.

First, referring to FIG. 1, a general facsimile apparatus will be described below. FIG. 1 is a block diagram of a general facsimile apparatus, which comprises a communication processor 101, a modulator and demodulator (MODEM) 102, a coder and decoder (CODEC) 103, a picture memory 104, a controller 105, a recorder 106 and a pick-up device 107.

In FIG. 1, communication processor 101 performs a necessary protocol when a communication path is set to receive and transmit data (hereinafter called "picture data"). Modem 102 modulates and demodulates the picture data transmitted and received during communication. Using a predetermined compression algorithm, codec 103 codes the picture data prior to transmitting, and decodes the received picture data using the decompression algorithm in correspondence to the compression algorithm. Recorder 106 is ordinarily called a printer which records the received picture data on a sheet of paper or other medium. Pick-up device 107 is ordinarily called a scanner, which picks up alphanumeric characters and/or images printed on a sheet of paper or the other media and converts the picked-up impression into electrical signals. Controller 105 which comprises a central processing unit (CPU), a nonvolatile memory (ROM) and a random access memory (RAM) is connected to the respective blocks of the facsimile apparatus to perform various control operations. Here, the ROM is a memory in which software programs and various data processed in the CPU are stored, and the RAM is a memory used as the working region of the CPU.

Recorder 106 in the facsimile apparatus having the above-mentioned construction may use a continuous roll of paper or separate sheets of paper when the received picture data is recorded.

When using the rolled paper, although the received picture data is not lost, the output paper tends to curl when the paper gets out of the exit. Thus, to eradicate the above-mentioned phenomenon, a special apparatus should be additionally provided. Also, cutting the roll of paper and filing the curled sheets are very cumbersome, and so the prevalence of facsimile apparatuses which use separate sheets of paper has gradually increased. However, in order to record the received picture data on separate sheets, various control operations (not needed when employing rolled paper) are necessary to avoid picture data loss.

Here, three conventional facsimile recording methods using separate sheets of paper will be briefly described.

In a first method, a leading end margin exists only on the first page of the received facsimile message, and does not reoccur or subsequent sheets. According to this method, if the end of one sheet is recognized, a form feeding operation (to feed a new sheet of paper for recording) is performed to record subsequent lines of the picture data on the next sheet. Accordingly, the picture data which is recorded in a beginning or ending portion of the sheet of paper is apt to be lost. Otherwise, picture data with respect to characters which should be recorded on the same sheet of paper is apt to be separately recorded on two sheets.

U.S. Pat. No. 4,924,324 discloses an apparatus to solve the problem of the above recording method. Here, a leading end margin and a trailing end margin are set for each sheet of paper, wherein a single character may comprise l print lines which are handled as a single block in recording, ensuring that individual blocks are recorded on the same sheet of paper. However, when the picture data is transmitted, since the actual location where the top of a character begins to appear is irregular, and character size may vary for every given sheet of paper, certain problems persist in the implementation of this second method.

In a third method, the picture data recorded near the trailing end portion of the sheet of paper, is re-recorded on the leading end portion of the next sheet of paper. For picture data being thus recorded, although loss of data can be prevented, the output has a poor appearance which is apt to result in confusion.

SUMMARY OF THE INVENTION

Therefore, to solve the above problems, it is an object of the present invention to provide a facsimile data recording method in which the recording format thereof has a good appearance and loss of received picture data can be prevented.

To accomplish the above object of the present invention, there is provided a method for recording data on a sheet of paper in a facsimile apparatus which comprises a recorder for recording received picture data on separate sheets of paper, comprising the steps of:

setting a divisible region comprising a plurality of line picture data among the picture data awaiting recording, and capable of performing page division;

setting a line which has the minimum number of black pixels among the lines included in the divisible region as a page division line; and performing recording of all the picture data while performing a form feeding operation between the page division line and the next line thereto.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

The facsimile data recording method according to the present invention will be described below in more detail with reference to the accompanying drawings.

Figure 1:
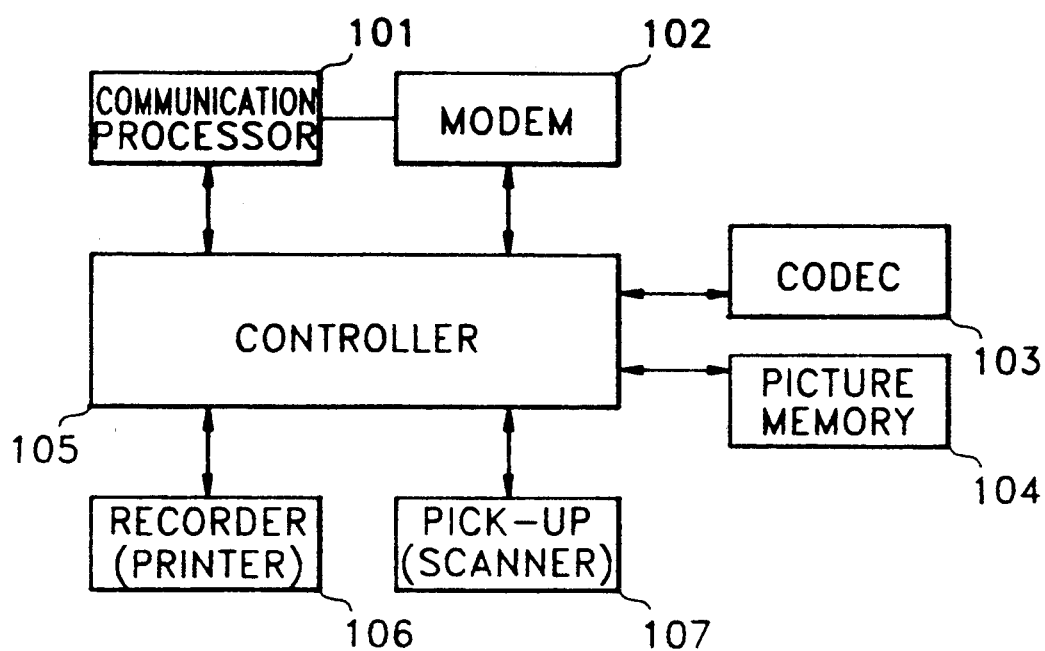
FIG. 1 is a block diagram of a general facsimile apparatus.
Figure 2:
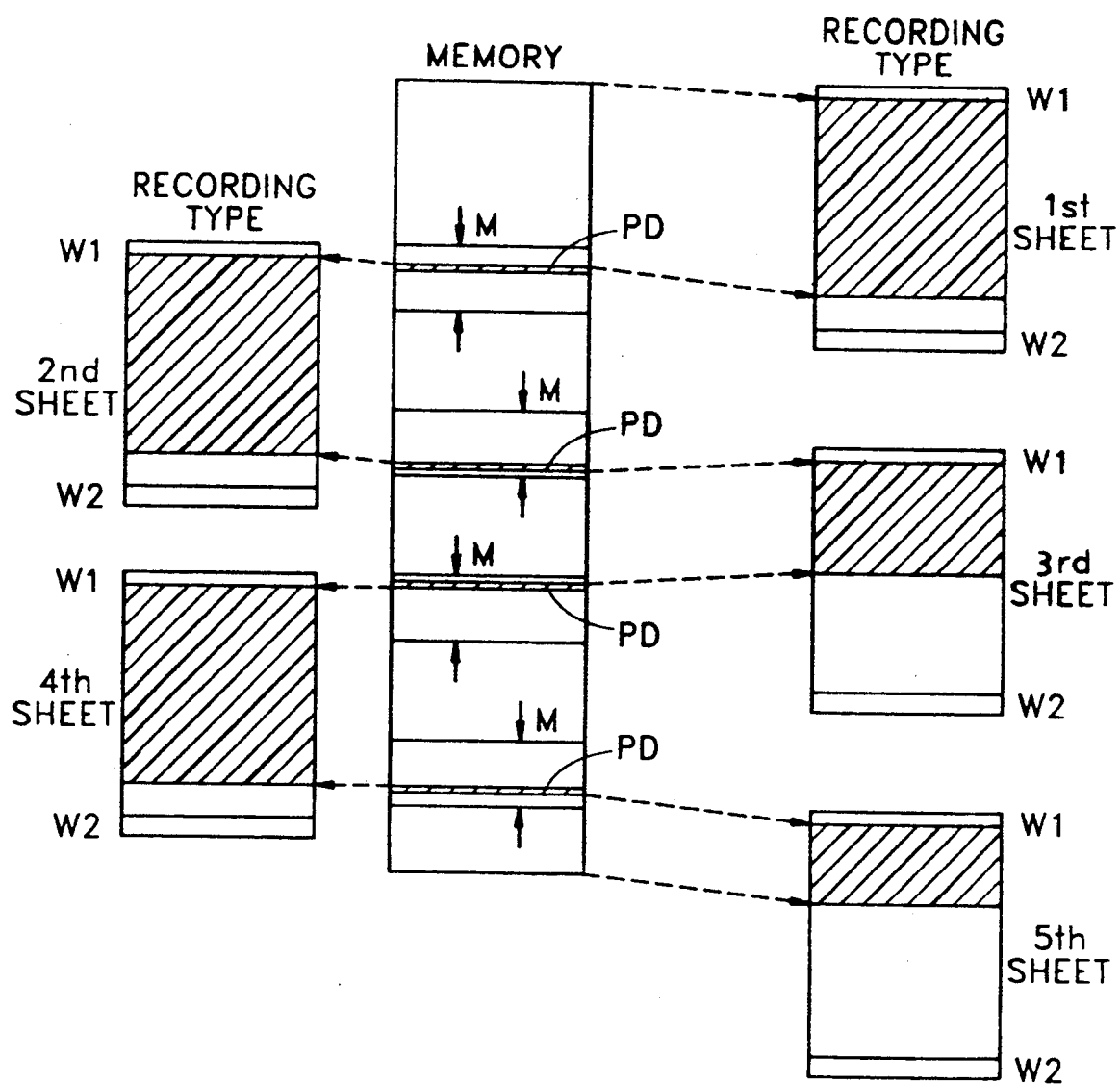
FIG. 2 illustrates a recording method according to a first embodiment of the present invention.

In FIG. 2, for the sake of the explanation, it is assumed that the size of the picture memory where the picture data waiting for being recorded is stored has not been limited. However, since the amount of the actual picture data is voluminous, the size of the picture memory is limited. To efficiently operate such a picture memory, a writing pointer for writing the picture data in the picture memory and a reading pointer for reading the picture data stored in the picture memory are independently operated to each other. At the same time, to write new picture data in the memory space which stores data which is not used any more, the respective pointers should be operated in modules with respect to the size of the picture memory.

Hereinbelow, the picture data recording method (without considering the problems of the picture memory operation) will be described.

Figure 3:
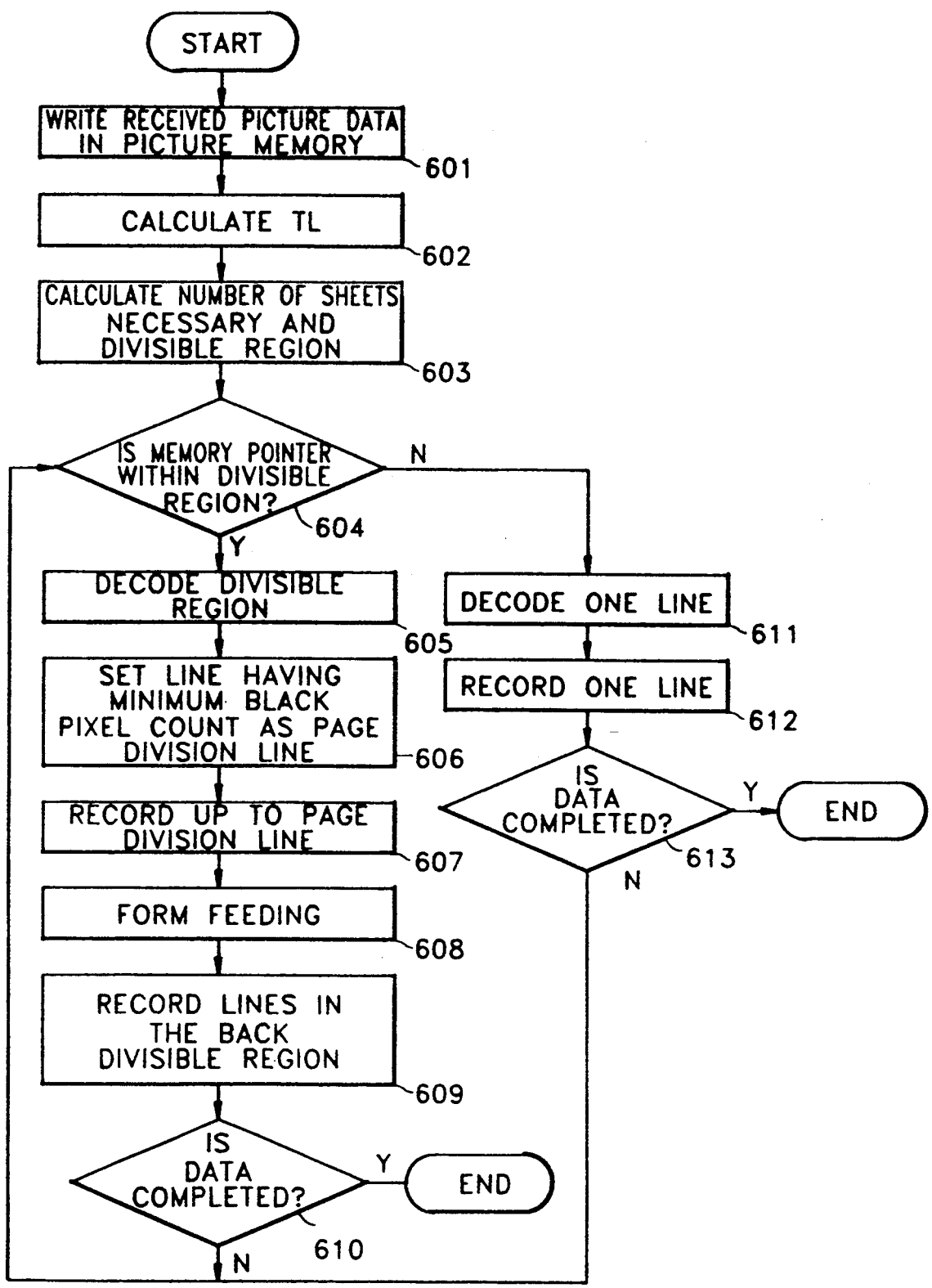
FIG. 3 is a flowchart for carrying out the recording method of FIG. 2.

FIG. 3 is a flowchart for performing the recording method as shown in FIG. 2. This recording method will be described below with reference to FIGS. 2 and 3.

In step 601, the facsimile apparatus sequentially writes the picture data received through the transmission path in picture memory 104. In step 602, a number of page lines TL which can be recorded on a single sheet of paper is calculated. As shown in FIG. 2, assuming that the leading end margin is W1, the trailing margin is W2, the number of lines which is recorded per a unit of length is a line density m (lines/mm) and the length of the sheet of paper is PL, the number of page lines TL is calculated to be m(PL-W1-W2). Here, if the calculated value is not an integer, the number of page lines TL is determined to be the maximum integer not exceeding the calculated value.

In step 603, the number of the separate sheets of paper to be required is calculated and a divisible region is determined. The divisible region is set using the total number of page lines TL. To more specifically describe the divisible region, the divisible region is the region that the page division operation (form feeding operation) may be performed in one line among the lines included therein. If the divisible region consists of M lines, the first divisible region is determined as line 1 to line TL, the second divisible region is determined as line (TL+1) to line (2TL-M), the third divisible region is determined as line (2TL-M+1) to line (3TL-2M), . . . , and so on. If the picture data upto the page division line among the picture data of the divisible region is called front division picture data and the rest picture data is called rear division picture data, the front division picture data is recorded on the sheet of paper which is currently being recorded and the rear division picture data is recorded on the next sheet of paper. If the divisible region is set as described above, the actual recording is per/brined through steps 604–613.

In step 604, it is determined whether the picture data to be recorded is in a divisible region during recording. If it is not in the divisible region, the picture data of a single line is decoded according to a predetermined algorithm through step 611, and then is recorded on the sheet of paper through step 612. As the above procedure is repeated by a predetermined number, the next picture data to be recorded is located within the divisible region. If the next picture data to be recorded is in the divisible region, all the picture data included in the divisible region is decoded in step 605 and a line which contains the minimum black pixel is set to a page division line PD in step 606. After the page division line is set, the picture data which is decoded up to the page division line is sequentially recorded on the same sheet of paper on which the recording is being performed in step 607. In step 608, the form feeding operation is performed. That is, the new sheet of paper for recording is fed. Here, recorder 106 of the facsimile apparatus can perform recording of the white data at the lower part of the recording sheet of paper prior to performing the form feeding operation, and can also perform the form feeding operation immediately after the page division line is recorded. In step 609, the unrecorded portion among the divisible region is recorded on the tipper part of the next recording sheet of paper. Here, prior to this recording, recorder 106 of the facsimile apparatus can record the white data in leading margin W1, and can perform the line feeding operation or leading margin W1 by means of a mechanical operation. In steps 610 and 613, it is determined whether the recording of the picture data is completely finished. Here, if the recording of the picture data is not completely finished, the operation is advanced to step 604, to thereby repeat the above-described recording operation.

FIG. 2 shows a recording state which can appear on the recording sheet of paper when performing the above-described recording operation. In FIG. 2, the picture data is recorded in the shaded portions of the drawing. Particularly, in FIG. 2, for the convenience of explanation, the divisible region is very largely illustrated. However, if the number of lines in the divisible region is determined as M in applications, and the number of lines which represent a single character is CL, line number M of the divisible region is desirably set as a value between CL and 2 CL. However, the divisible region line number M can be set as a value more than 2 CL according to circumstances.

Figure 4:
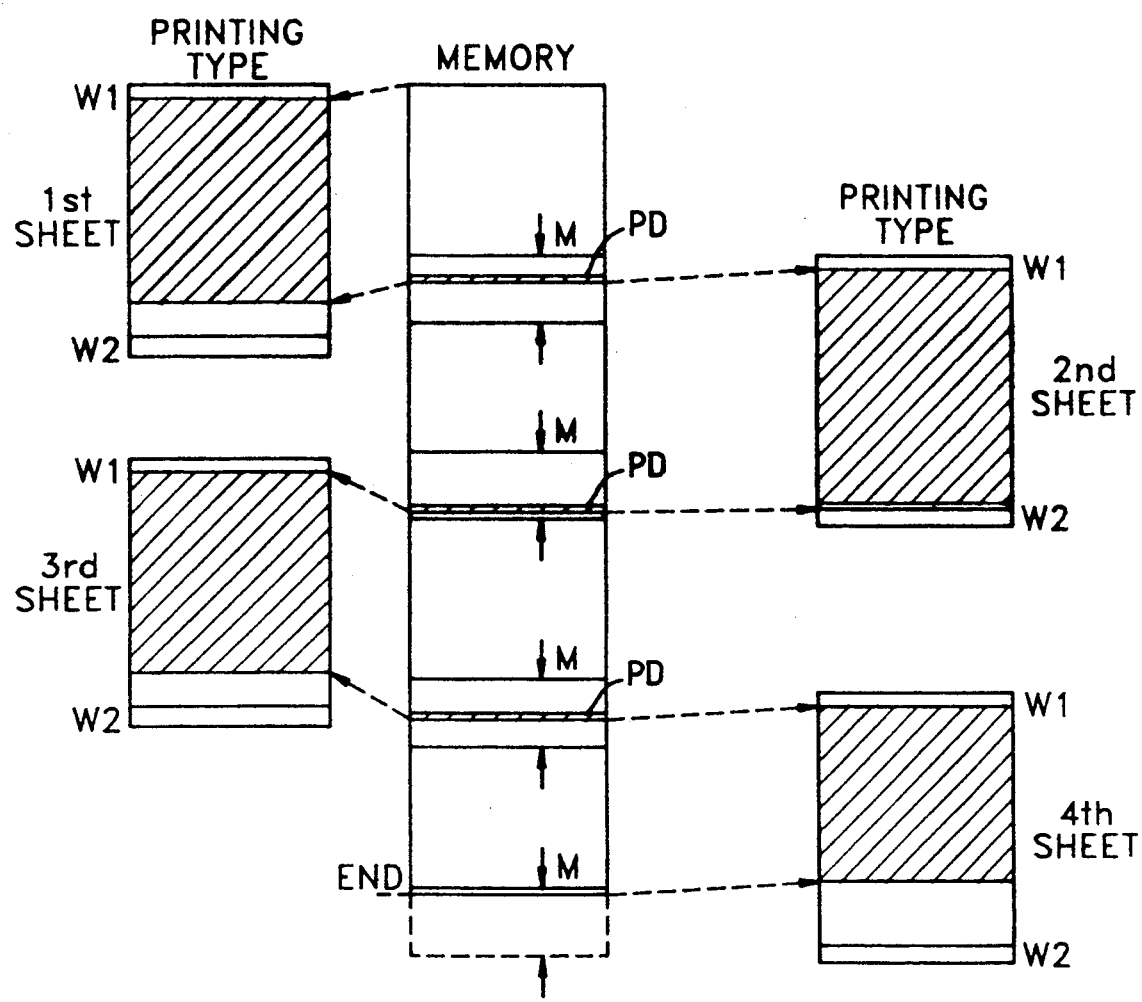
FIG. 4 illustrates a recording method according to a second embodiment of the present invention.
Figure 5A:
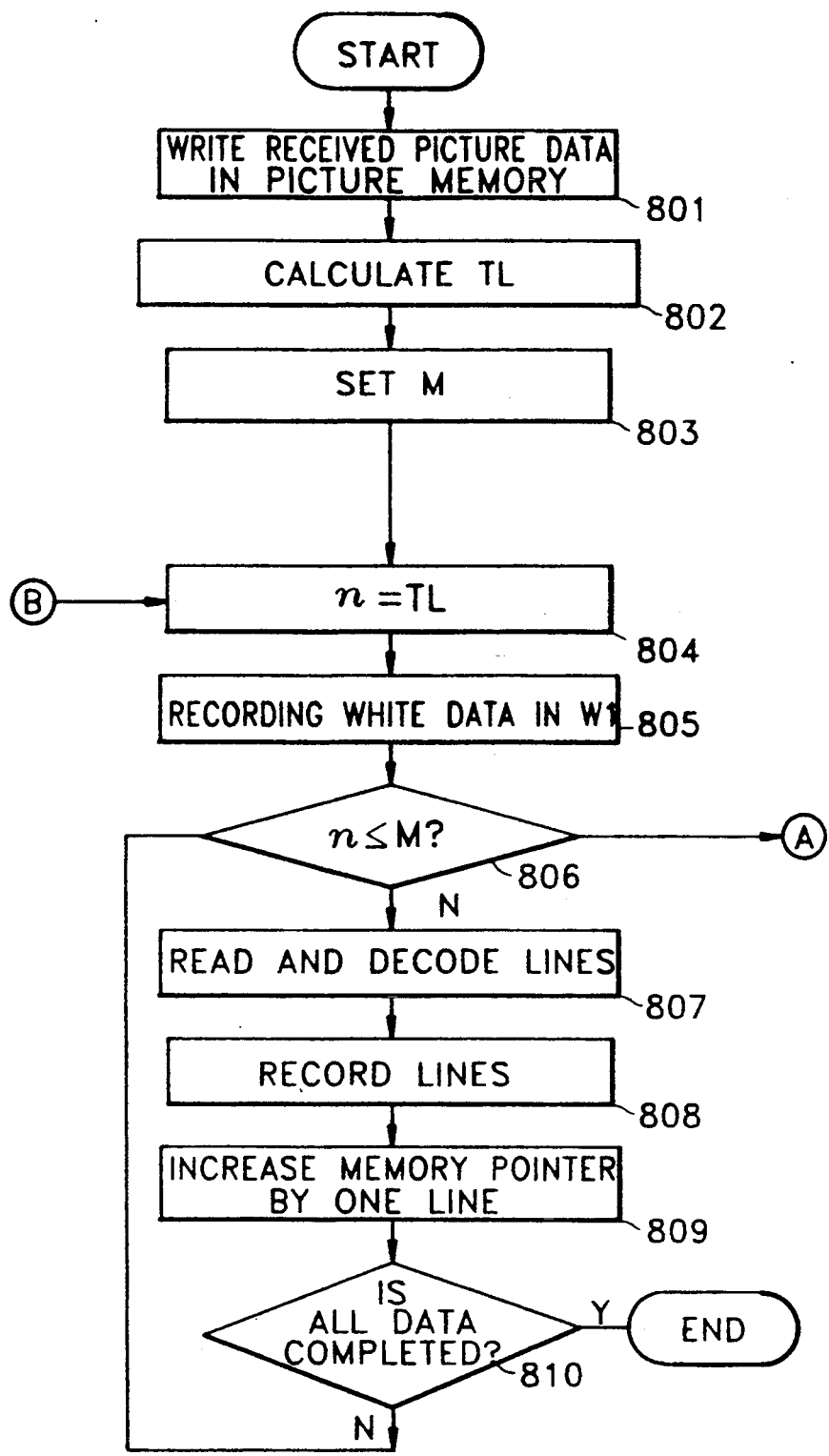
FIGS. 5A and 5B is a flowchart for carrying out the recording method of FIG. 4.
Figure 5B:
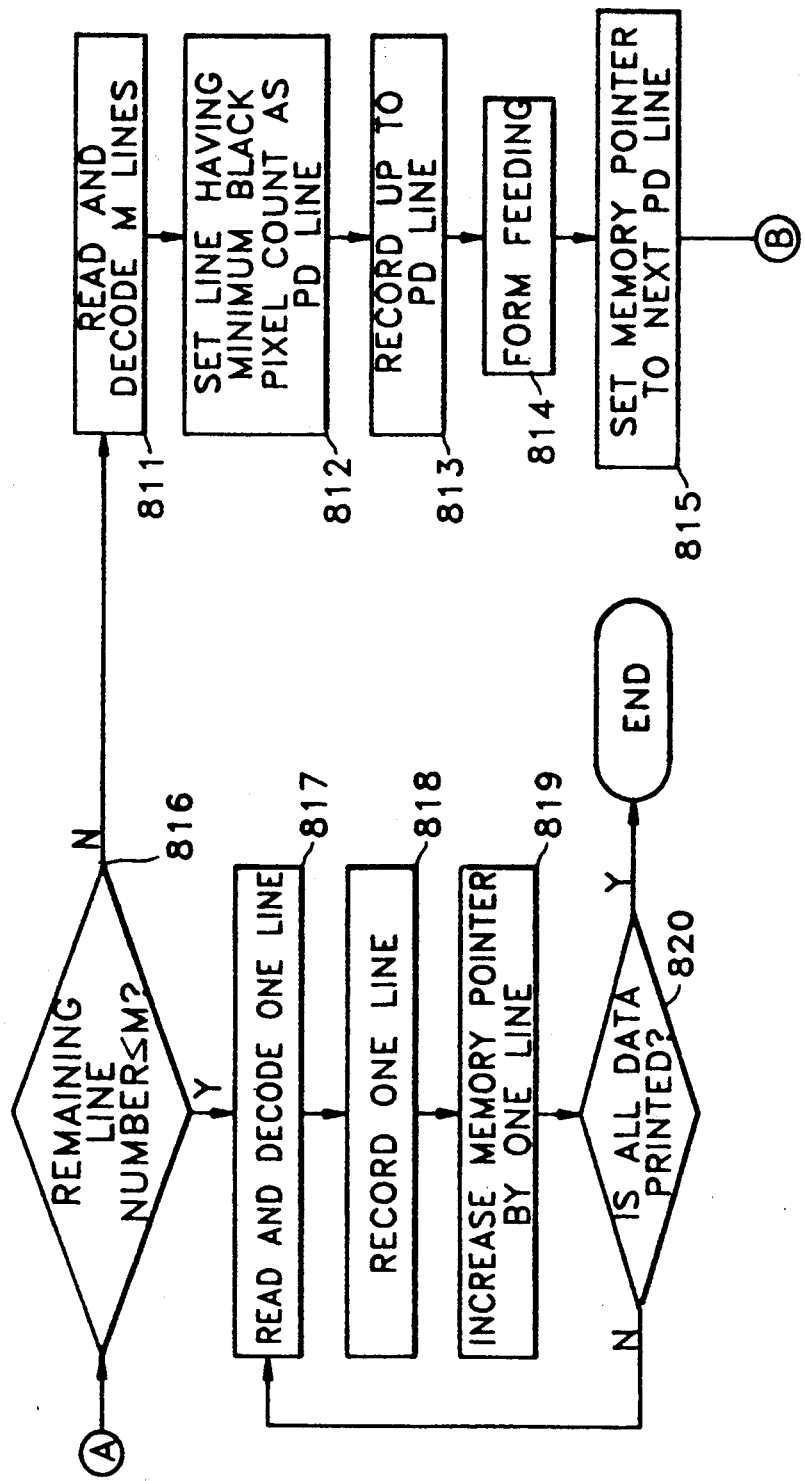

FIG. 4 is a view for explaining the recording method according to the second embodiment of the present invention. FIGS. 5A and 5B is a flowchart for performing the recording method of FIG. 4. The second embodiment of the recording method will be described below with reference to FIGS. 4, 5A and 5B. The second embodiment dynamically sets the divisible region differently from the first embodiment. Thus, the second embodiment can save recording paper.

In FIG. 5A, steps 801 and 802 perform the same functions as those of steps 601 and 602 of FIG. 3, in which the received picture data is sequentially written in picture memory 104 and the number of page lines TL capable of being recorded on the recording sheet of paper is calculated. In step 803, the number of lines M included in the divisible region is determined, in which the user can input the predetermined number through an operational unit or the predetermined value can be internally set in the facsimile apparatus. Also, the number of lines forming a single character is detected by analyzing a part of the received picture data, so as to set the detected value as M. As described above, if variables, i.e., the number of page lines TL and the number of lines M in the divisible region, are determined, the actual recording operation is performed through steps 804–820.

Step 805 is a step of recording the white data on the leading margin of the recording sheet of paper, in which this step can be substituted with the mechanical line feeding operation. The value of a variable n represents the number of recordable lines on the recording sheet of paper on which the recording operation is being performed. In step 804, the variable n is set as the number of page lines TL. Thereafter, the variable n is decreased by one for each occurrence of a recording operation corresponding to one line of printing, through steps 807–810. If variable n matches the number of lines M in tile divisible region by repetitious subtraction, the operation is advanced to step 816 to perform the recording for the divisible region. When more specifying the line-by-line recording, one-line of picture data is read out from picture memory 104 in step 804 to be decoded according to a predetermined algorithm in step 807, and is recorded by recorder 106 in step 808. If the one-line of picture data is recorded, the memory pointer for recording is increased by one line in picture memory 104, and variable n is decreased by one. Here, the memory pointer for recording operates separately from the reading pointer. That is, memory pointer for recording varies only when the actual recording is performed, while tile reading pointer is the same as the memory pointer for recording during recording, but the reading pointer may be different from the memory pointer for recording when decoding tile picture data stored in the picture memory.

In step 816, it is determined whether the amount of picture data ready to be recorded is proper to be recorded on the remainder of the current recording sheet. If the remaining picture data is an amount is appropriate to be recorded, line-by-line recording is performed tip to the end of the picture data, through steps 817–820.

In step 811–815, the line having the minimum number of black pixels count among the lines included in the divisible region is set as a page division line, and all the lines up to tile page division line are recorded on the recording sheet of paper on which tile recording is being performed. Next, the respective variables are controlled, so that subsequent picture data can be recorded. In step 811, using the above-mentioned reading pointer, the picture data (corresponding to M lines set in step 803) among the picture data ready to be recorded after being written in picture memory 104 is read out, to thereby decode the read picture data according to the predetermined algorithm. In step 812, the line having the minimum number of black pixels is set as page division line PD. In step 813, the picture data (tip to the page division line) is sequentially recorded on the recording sheet of paper on which the recording is being performed. As explained in FIG. 3, the white data can be recorded in trailing portion of the recording sheet of paper. Here, the trailing portion is tile same as or larger than trailing end margin W2. Otherwise, trailing portion can be set so that the form feeding operation is performed immediately after the page division line is recorded. In step 815, the memory pointer for recording is set to indicate the next line to page division line PD. Here, when recorder 106 of the facsimile apparatus includes a printing memory for recording, the unrecorded picture data among the picture data in the divisible region is written in the printing memory as the upper portion of the picture data to be recorded on the next recording sheet.

As described above, in the facsimile data recording method according to the present invention, the recording appearance is good and the loss of received picture data is prevented. Also, the method according to the present invention can be embodied via software to avoid expenditure of additional hardware costs.

The present invention is not limited to the above embodiment, and may be variously modified within the spirit of the technical concept of the invention as set forth in the appended claims.

What is claimed is:

1. A facsimile data recording method for recording received picture data on separate sheets of paper in a facsimile apparatus, said method comprising the steps of:

setting a portion of said received picture data as a divisible region during reception of said received picture data and not during transmission regardless of relative lengths of sheets of paper used at a receiving station and a transmitting station, said divisible region being a region that a form feeding operation is permissible;

setting a line within said divisible region having a minimum number of black pixels as a page division line; and recording said received picture data including white data corresponding to a leading end margin and a trailing end margin and performing said form feeding operation immediately after said page division line is detected.

2. The facsimile data recording method according to claim 1, wherein said divisible region comprises a number of lines not less than that required to represent a single character on a single sheet of paper.

3. The facsimile data recording method according to claim 1, further comprised of said received picture data recorded at an end portion of a first sheet of recording paper not being re-recorded at a beginning portion of a second sheet of recording paper, said second sheet of recording paper being recorded on immediately after said first sheet of recording paper is recorded on.

4. A facsimile apparatus for recording received picture data by the method claimed in claim 1.

5. A facsimile data recording method for recording received picture data on separate sheets of paper in a facsimile apparatus, said method comprising the steps of:

setting a page line number representing a maximum number of lines capable of being recorded on one sheet of paper;

setting a divisible region in dependence upon said page line number, said divisible region being a region that a form feeding operation is permissible, said divisible region having a number of lines less than said page line number;

setting a first recording in dependence upon said number of lines in said divisible region and said page line number;

recording white data corresponding to a leading end margin and then recording a portion of said received picture data corresponding to said first recording line;

setting a line having a minimum number of black pixels as a page division line;

recording a front portion of said divisible region, said front portion of said divisible region extending up to said page division line; and repeating said steps of setting said first recording line and said page division line and said recording steps above until all the received picture data is completely recorded, said method performed entirely at a receiving station of said facsimile apparatus irrespective of relative lengths of transmitting and receiving sheets of paper.

6. The facsimile data recording method according to claim 5, wherein said step of setting said page line number is performed by subtracting said leading end margin and a trailing end margin from a length of the sheet of paper to be recorded on to obtain a first quantity, and then multiplying said first quantity by a recording line density.

7. The facsimile data recording method according to claim 5, further comprising a step of recording white data on the leading end margin of the recording sheet of paper.

8. The facsimile data recording method according to claim 5, further comprising a step of recording white data corresponding to a trailing end margin immediately after recording said front portion of said divisible region.

9. The facsimile data recording method according to claim 5, further comprising a step of performing a form feeding operation immediately after detecting said page division line.

10. The facsimile data recording method according to claim 5, further comprised of said received picture data recorded at an end portion of a first sheet of recording paper not being re-recorded at a beginning portion of a second sheet of recording paper, said second sheet of recording paper being recorded on immediately after said first sheet of recording paper is recorded on.

11. The facsimile data recording method according to claim 5, further comprised of said number of lines in said divisible region being not less than that required to represent a single character on a single sheet of paper.

12. A facsimile apparatus for recording received picture data by the method claimed in claim 5.

13. A facsimile data recording method for recording received picture data on separate sheets of recording paper in a facsimile apparatus, said method comprising the steps of:

writing said received picture data and white data representing leading and trailing margins into a picture memory;

calculating a page line number representing a maximum number of line numbers capable of being recorded on a single sheet of paper;

setting a divisible region in dependence upon said page line number, said divisible region being an area that a form feeding operation is permitted, said divisible region being comprised of a front division and a rear division;

setting a counter variable to be equal to said page line number;

recording lines of white data representing said leading margin onto one of said sheets of recording paper;

recording said received picture data immediately after recording said white data;

decreasing said counter variable by one for each line of white data and received picture data that is recorded;

comparing said counter variable to a divisible region number to determine whether lines within said divisible region are being recorded;

setting a line within said divisible region having a minimum number of black pixels as a page division line;

recording said front division of said divisible region, said front division of said divisible region extending up to said page division line; and performing a form feeding operation immediately after detecting said page division line, said method performed at a receiving station of said facsimile apparatus irrespective of relative lengths of transmitting and receiving sheets of paper.

14. The facsimile data recording method according to claim 13, further comprised of said divisible region being determined by a user input.

15. The facsimile data recording method according to claim 13, further comprised of said divisible region being internally set by said facsimile apparatus.

16. The facsimile data recording method according to claim 13, further comprised of said step of calculating said page line number being performed by subtracting said leading margin and said trailing margin from a length of one of said sheets of recording paper to obtain a first quantity, and then multiplying said first quantity by a recording line density.

17. The facsimile data recording method according to claim 13, further comprised of said front division of said divisible region being recorded on a first sheet of recording paper and said rear division being recorded on a second sheet of recording paper, said second sheet of recording paper being recorded on immediately after said first sheet of recording paper is recorded on.

18. The facsimile data recording method according to claim 13, further comprised of said divisible region having a number of lines that is not less than that required to represent a single character on a single sheet of paper.

19. The facsimile data recording method according to claim 13, further comprised of repeating said steps until all received picture data is recorded.

20. A facsimile apparatus for recording received picture data by the method claimed in claim 13.

* * * * *